(12) United States Patent
Fu et al.

(10) Patent No.: US 8,495,516 B2
(45) Date of Patent: Jul. 23, 2013

(54) METHOD OF DISPLAYING DOWNLOADING PROGRESS OF FILE

(75) Inventors: Yaoyuan Fu, Shenzhen (CN); Meng Li, Shenzhen (CN); Yingying Yang, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 44 days.

(21) Appl. No.: 13/379,003

(22) PCT Filed: Jun. 19, 2009

(86) PCT No.: PCT/CN2009/000672
§ 371 (c)(1),
(2), (4) Date: Dec. 17, 2011

(87) PCT Pub. No.: WO2010/145048
PCT Pub. Date: Dec. 23, 2010

(65) Prior Publication Data
US 2012/0096387 A1    Apr. 19, 2012

(51) Int. Cl.
*G06F 3/048*    (2013.01)

(52) U.S. Cl.
USPC .......................................................... 715/772

(58) Field of Classification Search
USPC .......................................................... 715/772
See application file for complete search history.

(56) References Cited

U.S. PATENT DOCUMENTS

| 8,375,319 | B2* | 2/2013 | Decker et al. | 715/772 |
| 2004/0177323 | A1* | 9/2004 | Kaasila et al. | 715/513 |
| 2006/0031785 | A1 | 2/2006 | Raciborski | |

OTHER PUBLICATIONS

International Search Report of PCT/CN2009/000672.

* cited by examiner

*Primary Examiner* — Omar Abdul-Ali

(57) ABSTRACT

A displaying method of displaying a downloading progress of a file, including the following steps: downloading and restoring a poster of the file, and processing the poster to allow the poster to display the downloading progress of the other content of the file. With the present disclosure, the downloading progress of the other content of the file is displayed in the poster, and users are able to obtain the downloading progress when watching the poster, which brings a good using experience of products applying the displaying method.

10 Claims, 2 Drawing Sheets

METHOD OF DISPLAYING DOWNLOADING PROGRESS OF FILE

BACKGROUND

1. Technical Field

The present disclosure relates to interfaces of external devices and, particularly, to method of processing a menu of an external device.

2. Description of Related Art

With the advent of network era, network download becomes a necessary function of network products. Typically, televisions with network download functions become more and more popular. With this kind of television, users can download multimedia file like movies, music and pictures, which lights up people's life. Generally, a propagandistic poster is also downloaded with the multimedia file. For example, a poster is usually downloaded with a movie. During the downloading process of the multimedia file, the downloading progress is often shown by a progress bar. However, users may not be able to obtain the downloading process when watching the poster, which is monotonous and inconvenient for users.

Therefore, there is room improvement.

SUMMARY

The present disclosure provides a displaying method of displaying a downloading progress of a file. The displaying method includes the following steps:

downloading and storing a poster of a file; and processing the poster to allow the poster to display the downloading progress of the other content of the file.

Preferably, in the step of downloading and storing a poster of the file, the poster is downloaded before the other content of the file.

Preferably, the step of processing the poster to allow the poster to display the downloading progress of the other content of the file includes:

processing a transparency of the poster; and restoring the transparency which has been processed according to the downloading process.

Preferably, a length of the whole poster is determined before the step of restoring the transparency which has been processed according to the downloading process, and the transparency which has been processed is restored based on a lengthwise direction of the poster.

Preferably, the transparency which has been processed is restored periodically.

Preferably, the step of processing the poster to allow the poster to display the downloading progress of the other content of the file includes:

processing a background color of the poster; and restoring the background color which has been processed according to the downloading progress.

Preferably, the step of processing the poster to allow the poster to display the downloading progress of the other content of the file includes:

removing a background color of at least one portion of the poster and replacing the background color of the at least one portion of the poster with a predetermined color; and changing the predetermined color of the at least one portion of the poster according to the change of the downloading progress.

Preferably, the predetermined color of the at least one portion of the poster gradually becomes lighter as the downloading progress goes on.

Preferably, the step of processing the poster to allow the poster to display the downloading progress of the other content of the file includes:

changing a transparency of the poster and adding a particular color to the poster; and changing a degree of the color added to the poster according to the change of the downloading progress.

Preferably, the color added to the poster gradually becomes lighter as the downloading progress goes on.

Preferably, the file is downloaded by a television.

Preferably, the step of processing the poster to allow the poster to display the downloading progress of the other content of the file includes:

processing a portion of the poster to have a predetermined transparency; and adjusting an area of the portion of the poster based on the downloading progress.

Preferably, the poster is divided into a first portion and a second portion, the first portion corresponds to the original poster, and the second portion corresponds to the portion of the poster where the transparency thereof is processed.

Preferably, the second portion of the poster gradually becomes smaller as the downloading progress goes on.

Preferably, the second portion of the poster is adjusted periodically.

With the displaying method of the present disclosure, the downloading progress of the other content of the file such as the movie is displayed in the poster. Thus, users can obtain the downloading progress of the other content of the file directly when watching the poster, which can improve the experience of using products applying the displaying method.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Take the download of a movie as an example, when the movie is downloaded from the network to a local memory unit, both the movie and a poster thereof are downloaded. Since the amount of data of the poster is far smaller than that of the movie, the poster is often downloaded at first. In the present disclosure, the downloading progress of the movie is displayed in the poster to allow users to obtain the downloading progress when watching the poster.

Figure 1:
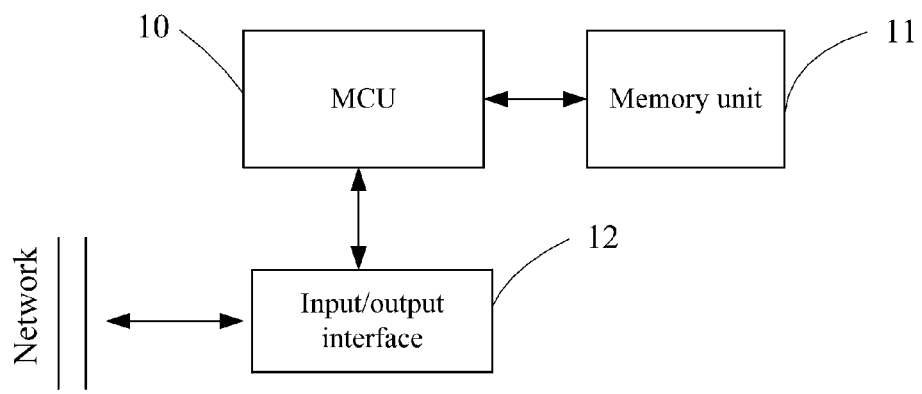
FIG. 1 is a schematic diagram showing network downloading process of a television in accordance with an embodiment of the present disclosure.

Referring to FIG. 1, a television in an embodiment includes a micro control unit (MCU) 10, a memory unit 11, and an input/output (I/O) interface 12. Under the control of the MCU 10, the television downloads movies from the internet or a particular server via the I/O interface 12 in a wired or wireless way and further stores the movies in the memory unit 11.

Compared to a movie, a poster of the movie has much smaller amount of data and thus is downloaded at first. After the poster is downloaded, the MCU 10 is capable of processing the poster to be transparent or semi-transparent by any known technology. In the embodiment, the MCU 10 is capable of processing the poster to allow the poster to have a predetermined transparency.

During download, the downloading progress is often expressed as a download ratio A which can be calculated as the following express A=M1/M, (wherein M1 is the amount of data that has been downloaded, M is the total amount of data of the movie). The calculation of the download ratio A is executed by the MCU 10.

Figure 2:
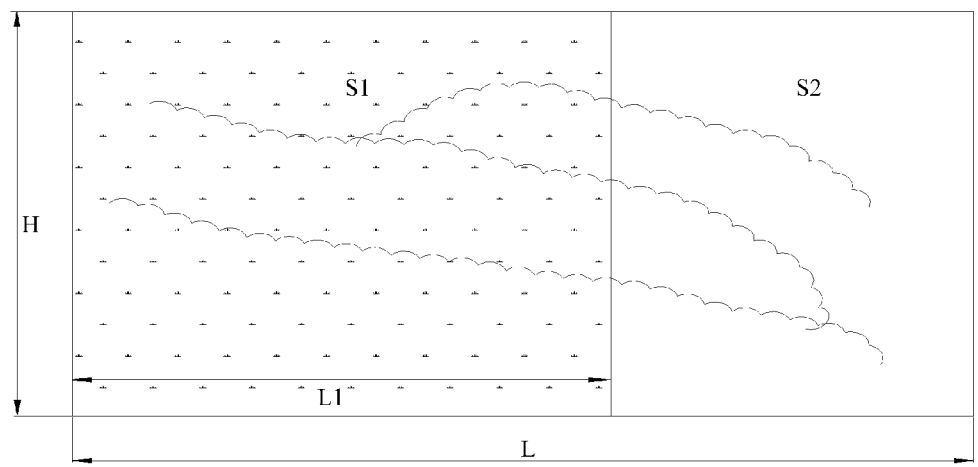
FIG. 2 is a schematic diagram showing a change of a transparency of a poster of the television of FIG. 1.

Referring to FIG. 2, after the poster is downloaded, the MCU 10 obtains a length L and a height H of the downloaded poster. During the downloading process of the movie, the poster and the downloading progress of the movie can be simultaneously obtained when users want to obtain the downloading process of the movie or want to watch the poster. The downloading progress is not displayed digitally, but shown in the background of the poster. For example, the poster is divided into a left portion S1 and a right portion S2. The left portion S1 displays the original poster, and the right portion S2 displays the poster which has the predetermined transparency. The length L1 of the left portion S1 can be expressed by the following expression L1=L*A. Since A represents the downloading progress of the movie, therefore, users can estimate the downloading progress of the movie via the length L1 of the left portion S1 directly. As the downloading process goes on, the area of the right portion S2 is adjusted to become smaller and smaller to show the change of the downloading progress of the movie in real time. In this state, the MCU 10 needs to calculate the length L1 of the left portion S1 periodically so that the area of the right portion S2 can also be adjusted periodically. Thus, a time interval T, like 2 seconds, between two continuous calculations is set in the MCU 10. The shorter the time interval T is, the better the display the will be.

Figure 3:
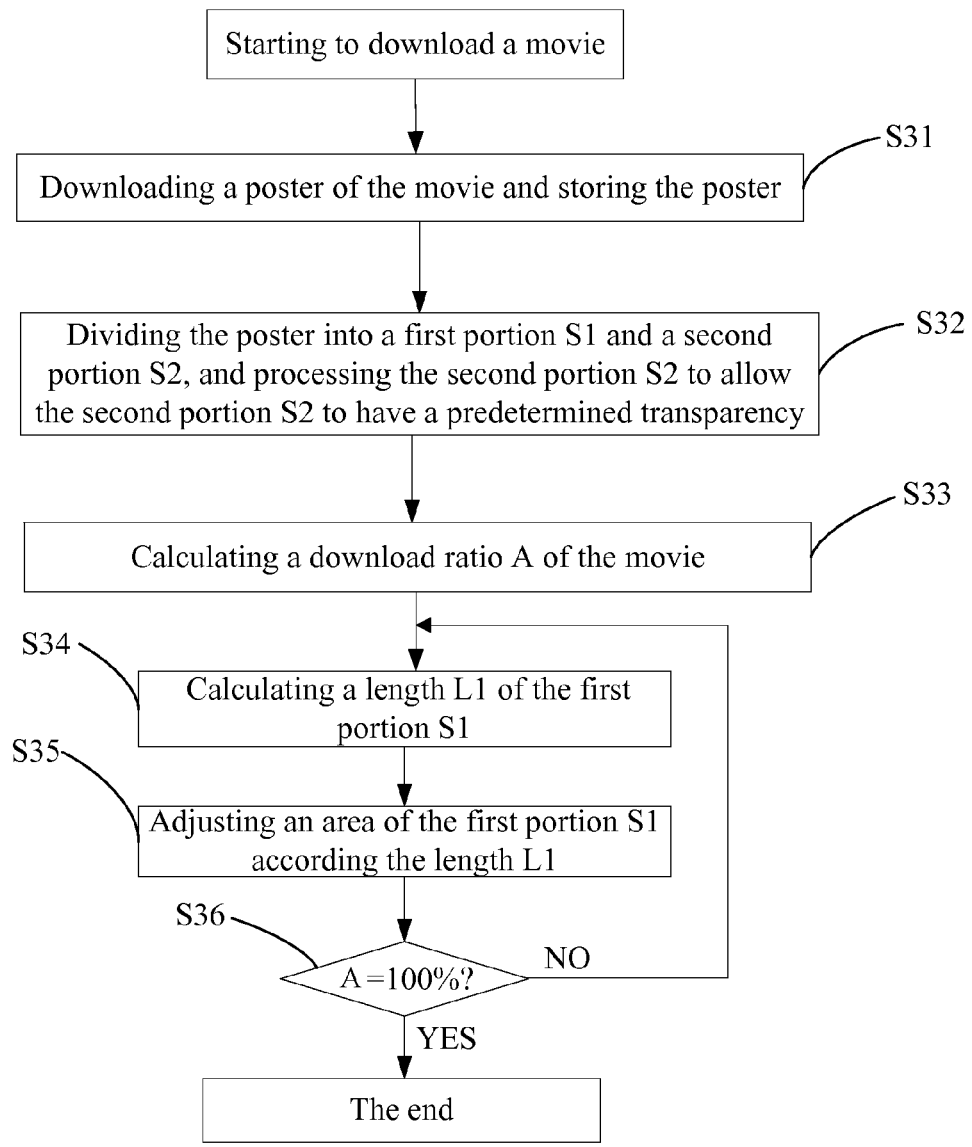
FIG. 3 is a flow chart of a displaying method of displaying network downloading progress of the television of FIG. 1.

Referring to FIG. 3, a displaying method of displaying downloading progress of a file such as a movie is provided. The displaying method includes the following steps:

step S31, downloading a poster of the movie and storing the poster;

step S32, dividing the poster into a first portion S1 corresponding to the original poster and a second portion S2, processing the second portion S2 to allow the second portion S2 to a have a predetermined transparency;

step S33, calculating a download ratio A showing the downloading process of the movie;

step S34, calculating a length L1 of the first portion S1 of the poster;

step S35, adjusting area of the first portion S1 according to the length L1;

step S36, determining whether the download ratio A is 100% or not, in other words, determining whether the movie has been downloaded completely or not, if the movie has been downloaded completely, the step S34 is implemented again; otherwise, the step S37 is implemented;

step S37, the end.

In the step S34, the length L1 of the first portion S1 of the poster is calculated periodically, and the time interval between two continuous calculations is two seconds in the embodiment. It is noted that the time interval between two continuous calculations is not limited to the embodiment. In other embodiments, the time interval may be set according to desires of users.

Obviously, in the embodiment, the poster can be divided into an upper portion displays the original poster and a lower portion displays the poster which has the predetermined transparency.

Additionally, the first portion S1 and the second portion S2 can be exchanged. That is, in the above embodiment, the second portion S2 displays the poster has the predetermined transparency, and the first portion S1 displays the original poster.

Additionally, the way to process the poster is not limited to this embodiment. In other embodiments, a background color of the poster instead of the transparency of the poster can be changed according to the downloading progress, which is obvious to those of ordinary skill in the art.

With the present disclosure, when the poster is processed, only the transparency or the background color of the poster is changed, and figures or scenes shown in the poster remain unchanged to allow users to watch the poster. Meanwhile, the downloading progress of the poster can be obtained by the poster.

In a second embodiment, the color of at least one portion of a background of the poster can be replaced with a different color, or the transparency of the whole poster can be changed and a special color can be added to the background of the poster. In this state, the color replacing the background or the color added to the background of the poster change corresponding to the downloading process. For example, different kinds of color can be defined by the MCU 10 and then be stored in the television. Then, the background of the poster is processed to be transparent while the original picture of the poster is remained. After that, a red color is added to the transparent background of the poster. During the downloading process of the movie, as the downloaded amount of data of the movie increases, the red color gradually becomes lighter and the original background color of the poster is gradually re-shown. Specifically, a dark red color means that the downloaded amount of data of the movie is small, and a light red color means that the downloaded amount of data of the movie is large.

From the above description, the displaying method of the present disclosure can be summarized as the following steps: downloading and storing the poster; processing the poster to allow the downloading progress of other information (such as the movie) to be displayed in the poster. The poster and the movie can be downloaded at the same time, or the poster can be downloaded in priority (that is, the poster is downloaded before the movie). The process of the poster can be adjustment of the transparency or the background color of the poster. The process of the poster can be adding of a color to the background color of the poster, and continuously change the added color, and so on.

It is noted in some embodiments, the displaying method can also be applied to other video or audio files with a poster for introducing the content of the file such as an e-book with a cover as the poster.

It is noted that in some embodiments, the displaying method can also be applied to a personal computer.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A displaying method of displaying a downloading progress of a file, comprising the following steps:
   downloading and storing a poster of a file; and
   processing the poster to allow the poster to display the downloading progress of the other content of the file;
   wherein the step of processing the poster to allow the poster to display the downloading progress of the other content of the file comprises:
   processing a transparency of the poster; and
   restoring the transparency which has been processed according to the downloading process.

2. The displaying method as claimed in claim 1, wherein in the step of downloading and storing a poster of the file, the poster is downloaded before the other content of the file.

3. The displaying method as claimed in claim 1, wherein a length of the whole poster is determined before the step of restoring the transparency which has been processed according to the downloading process, and the transparency which has been processed is restored based on a lengthwise direction of the poster.

4. The displaying method as claimed in claim 1, wherein the transparency which has been processed is restored periodically.

5. The displaying method as claimed in claim 1, wherein the file is downloaded by a television.

6. A displaying method of displaying a downloading progress of a file, comprising the following steps:
   downloading and storing a poster of a file; and
   processing the poster to allow the poster to display the downloading progress of the other content of the file;
   wherein the step of processing the poster to allow the poster to display the downloading progress of the other content of the file comprises:
   processing a background color of the poster; and
   restoring the background color which has been processed according to the downloading progress.

7. A displaying method of displaying a downloading progress of a file, comprising the following steps:
   downloading and storing a poster of a file; and
   processing the poster to allow the poster to display the downloading progress of the other content of the file;
   wherein the step of processing the poster to allow the poster to display the downloading progress of the other content of the file comprises:
   removing a background color of at least one portion of the poster and replacing the background color of the at least one portion of the poster with a predetermined color; and
   changing the predetermined color of the at least one portion of the poster according to the change of the downloading progress.

8. The displaying method as claimed in claim 7, wherein the color gradually becomes lighter as the downloading progress goes on.

9. A displaying method of displaying a downloading progress of a file, comprising the following steps:
   downloading and storing a poster of a file; and
   processing the poster to allow the poster to display the downloading progress of the other content of the file;
   wherein the step of processing the poster to allow the poster to display the downloading progress of the other content of the file comprises:
   changing a transparency of the poster and adding a particular color to the poster; and
   changing a degree of the color added to the poster according to the change of the downloading progress.

10. The displaying method as claimed in claim 9, wherein the color gradually becomes lighter as the downloading progress goes on.

* * * * *